United States Patent

Peacock et al.

(10) Patent No.: US 6,688,657 B2
(45) Date of Patent: Feb. 10, 2004

(54) SELECTABLE DOOR AND PANEL ACCESS MECHANISM

(75) Inventors: James Larry Peacock, Aloha, OR (US); William C. Wann, Jr., Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/003,385

(22) Filed: Oct. 30, 2001

(65) Prior Publication Data

US 2003/0080567 A1 May 1, 2003

(51) Int. Cl.[7] .................................. E05C 9/16
(52) U.S. Cl. ..................... 292/35; 292/36; 292/158; 312/293.2
(58) Field of Search .............. 292/DIG. 77, 35, 292/36, 41, 33; 290/158; 312/223.2, 293.2, 293.3

(56) References Cited

U.S. PATENT DOCUMENTS

| | | | | |
|---|---|---|---|---|
| 3,048,899 A | * | 8/1962 | Vincent | 49/152 |
| 3,403,473 A | * | 10/1968 | Navarro | 49/193 |
| 4,683,732 A | * | 8/1987 | Beattie | 70/118 |
| 4,811,518 A | * | 3/1989 | Ladisa | 49/193 |
| 4,906,033 A | * | 3/1990 | Sargent et al. | 292/3 S |
| 5,148,629 A | | 9/1992 | Minami | 49/193 |
| 5,367,828 A | * | 11/1994 | Hashemnia | 49/382 |
| 5,548,927 A | | 8/1996 | Song | 49/193 |
| 5,675,934 A | * | 10/1997 | Park | 49/193 |
| 5,829,197 A | * | 11/1998 | Oh | 49/193 |
| 5,926,916 A | * | 7/1999 | Lee et al. | 16/230 |
| 5,967,633 A | * | 10/1999 | Jung | 312/223.2 |
| 5,983,453 A | * | 11/1999 | Miwa | 16/231 |
| 6,000,771 A | * | 12/1999 | Wissinger et al. | 312/405 |
| 6,065,612 A | * | 5/2000 | Rinderer | 211/26 |

FOREIGN PATENT DOCUMENTS

| | | |
|---|---|---|
| DE | 2633914 | 2/1978 |
| DE | 3111595 | 10/1982 |
| EP | 342479 | 11/1989 |
| EP | 891027 | 1/1999 |
| FR | 2277965 | 3/1976 |
| FR | 2718783 | 10/1995 |
| FR | 2722827 | 1/1996 |
| IT | 1235544 | 9/1992 |
| JP | 02275278 | 11/1990 |
| JP | 03271476 | 12/1991 |
| JP | 06288162 | 10/1994 |
| JP | 7301484 | 11/1995 |
| JP | 08114059 | 5/1996 |
| JP | 8226271 | 9/1996 |
| JP | 08239289 | 9/1996 |
| JP | 09291738 | 11/1997 |
| JP | 10230872 | 9/1998 |
| JP | 10339071 | 12/1998 |
| JP | 11248339 | 9/1999 |
| SE | 8600505 | 8/1987 |
| SU | 1559082 | 4/1990 |

* cited by examiner

*Primary Examiner*—Robert J. Sandy
*Assistant Examiner*—André L. Jackson
(74) *Attorney, Agent, or Firm*—Lieberman & Brandsdorfer, LLC (57) ABSTRACT

A dual hinge door assembly is provided that enables selective opening of one side of a two sided door or removal of the door. The two sides of the door have identical assemblies that connect via a horizontal bar. Actuating a switch causes the bar to move horizontally in one of two directions. Movement of the bar causes assemblies on each side of the door to rotate and translate the horizontal motion of the bar to vertical motion of a set of lock pins, and causes the handle on the side of the door selected for opening to become visible to the operator. Upon pulling the handle, the side of the door adjacent to the lock will open while the opposite side remains stationary. Alternatively, the assembly may be modified to cause both handles to release. The operator may then pull both handles to remove the door from the housing.

19 Claims, 9 Drawing Sheets

SELECTABLE DOOR AND PANEL ACCESS MECHANISM

BACKGROUND OF THE INVENTION

1. Technical Field

This invention relates to hardware for computer housing. More specifically, the invention relates to a dual hinge door for allowing opening of the door from either side.

2. Description of the Prior Art

It is common for computer housing and other electronic enclosures to have doors and access panels for enclosing hardware components therein. Prior art doors utilize hinges and latches along one side or both sides of the door or panel. Examples of prior art apparatus include U.S. Pat. No. 5,926,916 to Lee et al. which teaches a computer housing with a door on a face of the housing. Each side of the door includes a handle. When the handle is rotated to open the door, a plurality of springs, and pins are actuated to cause the side of the door adjacent to the handle to release, and to cause the opposite side of the door to secure. Another prior art example is U.S. Pat. No. 3,403,473 to Navarro which teaches a hinge and latch mechanism for opening a door. A handle is centrally mounted on a front face of the door and may be rotated in an opposite direction selected for opening a specific side of the door. An arcuate segment on an interior side of the door panel is mounted to the handle. Upon rotation of the door handle, a notch in the arcuate segment engages a pin and a plunger for actuating a central link adjacent to one side of the door and vertical links secured thereto. However, the prior art neither provides a switch, or an equivalent apparatus independent of the handle, for selecting a side of the door for opening, nor a handle that only becomes visible to the operator upon actuation of a switch.

It is therefore desirable to provide an access panel that will allow an operator to select a specific side of the panel for opening, or to select to open both sides and remove the panel from the housing.

SUMMARY OF THE INVENTION

This invention comprises a dual hinge door for a computer housing. The door enables the operator to select either side of the door for opening based upon the needs of the operator.

A first aspect of the invention is a computer housing with a dual hinge door and a switch to select a side of the door to open. In addition to the switch, the door has a handle adjacent to each side of the door, and a safety lock on each side of the door to prevent accidental release. The safety lock has a lock pin that is adapted to be vertically deployed to prevent accidental release of the door. The switch is connected to a horizontal bar. Movement of the switch in either direction actuates a bell crank assembly on each side of the door and moves the handle on the selected side to a visible position. The bell crank assemblies convert horizontal motion from the horizontal bar to vertical motion of the Jock pins. The bell crank assembly on the side of the door selected for opening retracts a set of lock pins, and the bell crank assembly on the side of the door selected for remaining stationary engages a set of lock pins in the associated latches. Rotation of the switch releases the handle adjacent to a side of the door selected for opening. A pull of the handle causes the safety lock to engage the lock pin on an opposite side of the door selected to remain stationary, and opens a side of the door adjacent to the released handle. Alternatively, a pin in the switch may be released and a prong within the switch may be rotated to release a handle adjacent to each side of the door. Pulling of both handles adjacent to both sides of the door releases the door from the housing.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Computer hardware equipment is generally designed with access panels and/or doors for enclosing and protecting the hardware. Some of the designs associated with the access panels are designed to open from either a left side or a right side. However, due to space limitations it may be necessary to change the hinging associated with the panel to allow a person to open the access panel from the opposite side for which it was originally configured. Accordingly, there is a need for a dual hinge access panel wherein an operator can select a particular side of the panel for opening without having to reposition the equipment.

The dual hinge door of the preferred embodiment includes identical assemblies on both the left and right sides of the door. It is to be understood that the assembly on each side of the door are identical when the door is in a closed position and neither side of the door has been selected for opening. Once one side of the door has been selected for opening, the assemblies on each side of the door will operate in an opposite fashion to either secure the hardware on the unselected side or to release the hardware on the selected side. Accordingly, it should be noted that like reference numerals are used throughout the attached drawings to designate the same or similar elements or components.

Technical Background

Figure 1:
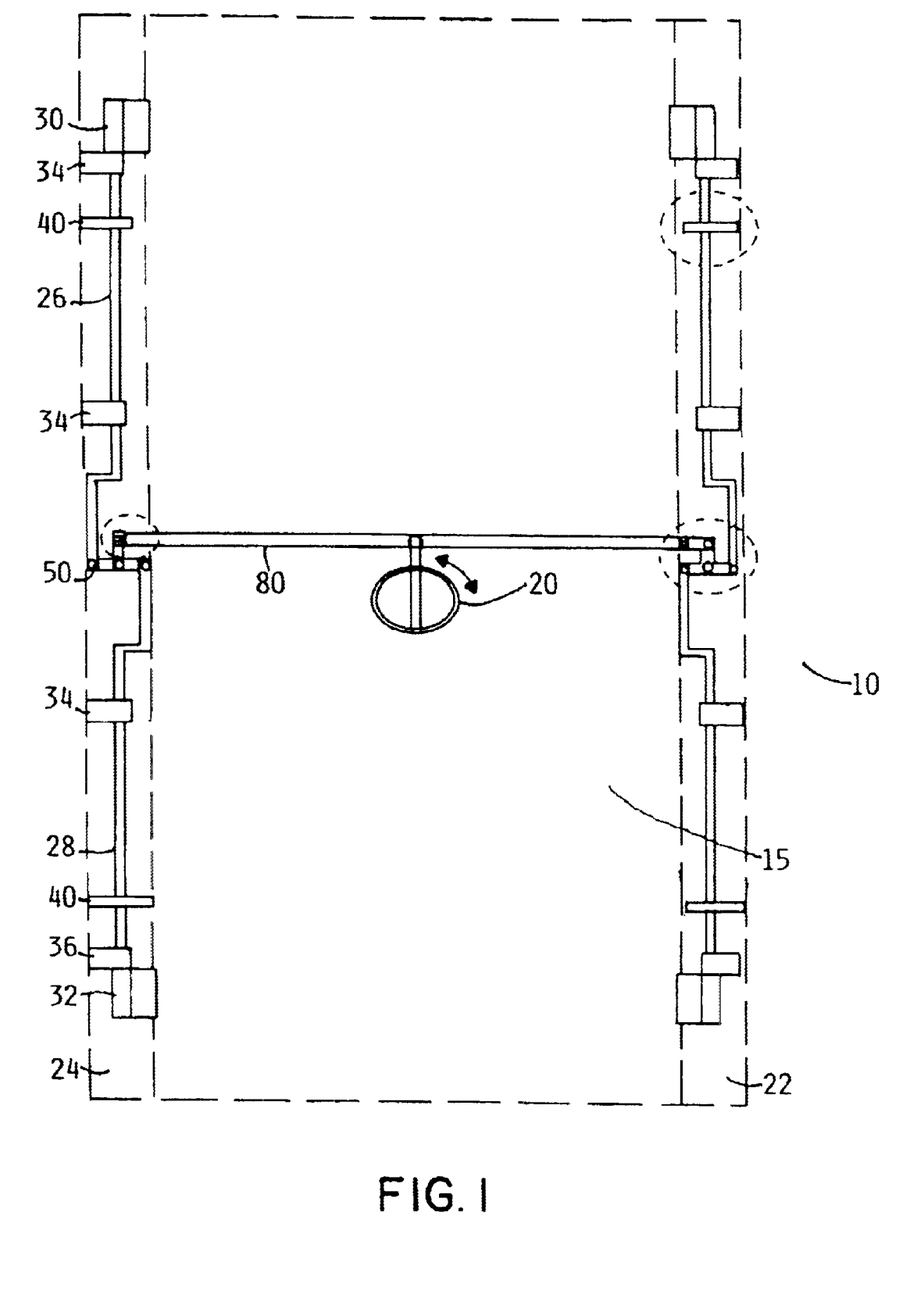
FIG. 1 is a front view of the dual hinge door assembly in a closed position according to the preferred embodiment of this invention, and is suggested for printing on the first page of the issued patent.

FIG. 1 is a front view of one embodiment of the dual hinge door assembly 10 showing the door 15 in a closed position. All components of the assembly 10, with exception of a switch 20, are located on either inside surface of the door 15, or on the sides of the door. The components of the assembly are not visible from the exterior side of the door. The right side of the door 22 and the left side of the door 24 include the same components. The top and bottom of each side of the door has a lock pin 26 and 28, respectively, which functions as a tool about which a hinge rotates when it is secured in a latch 30 and 32. Both latches 30 and 32 function as a support for holding the lock pin 26 and 28 in place. Adjacent to each of the latches 30 and 32 is a guide 34 and 36, respectively, for holding the pin 26 and 28 in alignment and maintaining the pin in a vertical position. The guide 36 in the lower section of the door also functions as a support for holding the weight of the door against the hinge. As such, each side of the door has three guides 34 and one support 36. Between the support 36 and the guide 34 is a safety lock mechanism 40 for preventing accidental release of the lock pin 28 from a hinged position while the door is in an open position. Another locking mechanism 40 is located on the upper section of the door between the two guides 34 to prevent accidental release of the lock pin 26 from a hinged position while the door is in an open position. Accordingly, alignment of the lock pin is important for enabling an operator to open the door and to rotate the secured side about the formed hinge mechanism.

Each side of the door has two lock pins 26 and 28. A top lock pin 26 extends from either side of the top of the door to a bell crank assembly 50 mounted at a middle section of the door. A bottom lock pin 28 extends from the bell crank assembly 50 to the bottom of the door. Both pins secure to different legs of the bell crank assembly 50. In addition to the assembly components on each side of the door, there is a horizontal bar 80 that secures to both sets of components at the bell crank assemblies. Accordingly the bell crank assembly functions as a mechanical tool for translating horizontal motion of the horizontal bar to vertical motion of the lock pins.

Figure 2:
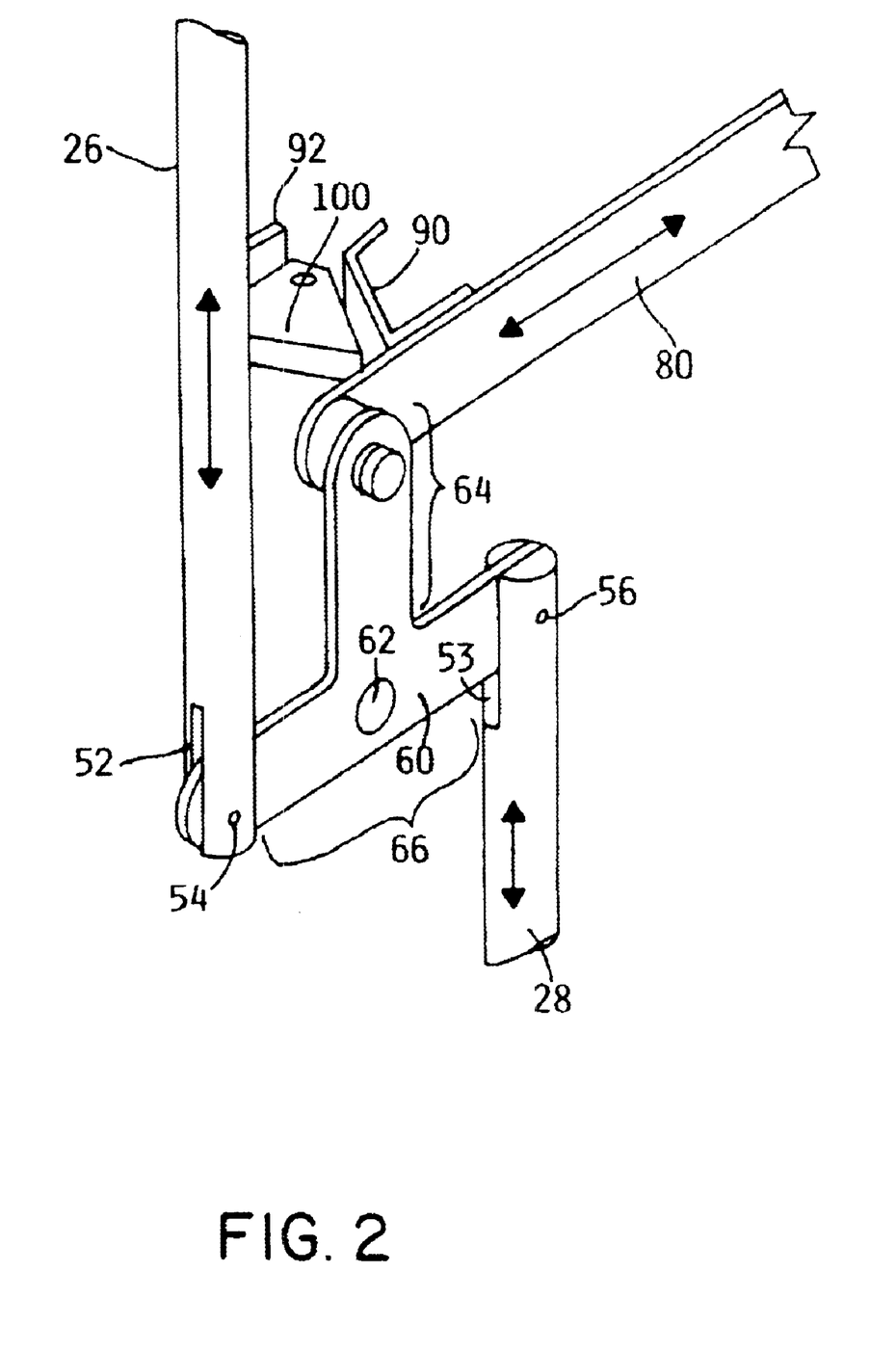
FIG. 2 is a front view of the bell crank assembly.
Figure 2A:
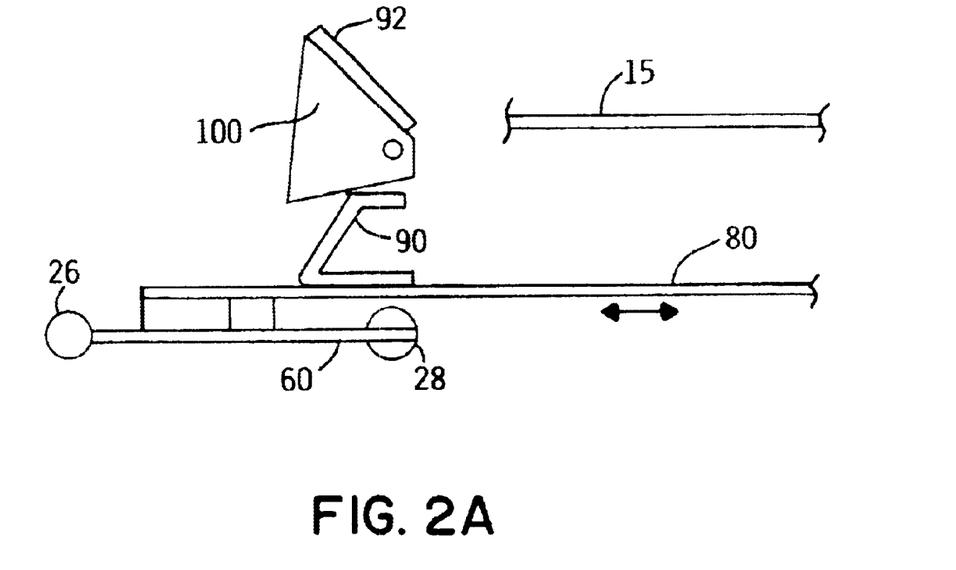
FIG. 2A is a top view of the door handle in a visible position.
Figure 2B:
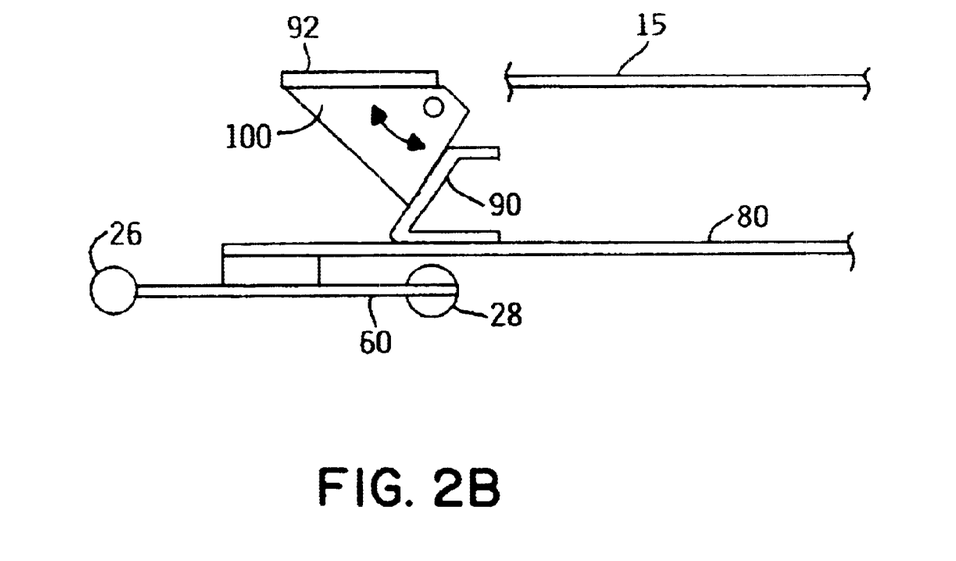
FIG. 2B is a top view of the door handle in a non-visible position.

FIG. 2 is a perspective view of the bell crank assembly 50. A lower section of the top lock pin 26 is shown with an opening 52. The opening 52 is adapted to secure the lock pin 26 to the bell crank 60 at 54. The bell crank 60 is a T-shaped component with a horizontal leg 66 and a vertical leg 64. Each side of the horizontal leg 66 is adapted to secure to either a top lock pin 26 or a lower lock pin 28. As shown in FIG. 2, the upper end of the lower lock pin 28 has an opening 53 adapted to secure the lock pin 28 to the bell crank 60 at 56. A middle section of the horizontal portion of the bell crank includes an aperture 62 adapted to receive a fastener (not shown) for securing the bell crank 60 to the door 15. By securing the bell crank 60 to the door 15, the assembly is provided the freedom to rotate about the aperture 62 which functions as a pivot point. The vertical leg 64 of the bell crank is secured to the horizontal bar 80 for translating horizontal motion between both sides of the door. Mounted to the horizontal bar 80 is a bracket 90. The bracket 90 is fixed to the horizontal bar 80. The door handle 100 is spring loaded and has an aperture adapted to receive a pin (not shown) that is secured to the door 15. The door handle 100 remains flush with the door through a secondary bracket 92. When the door is in a closed position, the door handle 100 is flush with the door or otherwise not readily visible to an operator, as seen in FIG. 2B. As the horizontal bar 80 moves toward the right, the bracket 90 provides a camming action to force the door handle to be released from the door, as seen in FIG. 2A. A similar but opposite action occurs on the left side of the door when the horizontal link 80 moves toward the left. Accordingly, the bell crank assembly 50 in conjunction with the horizontal link 80 forces the door handle to be released from the surface of the door upon selection of the side of the door for opening.

Figure 3:
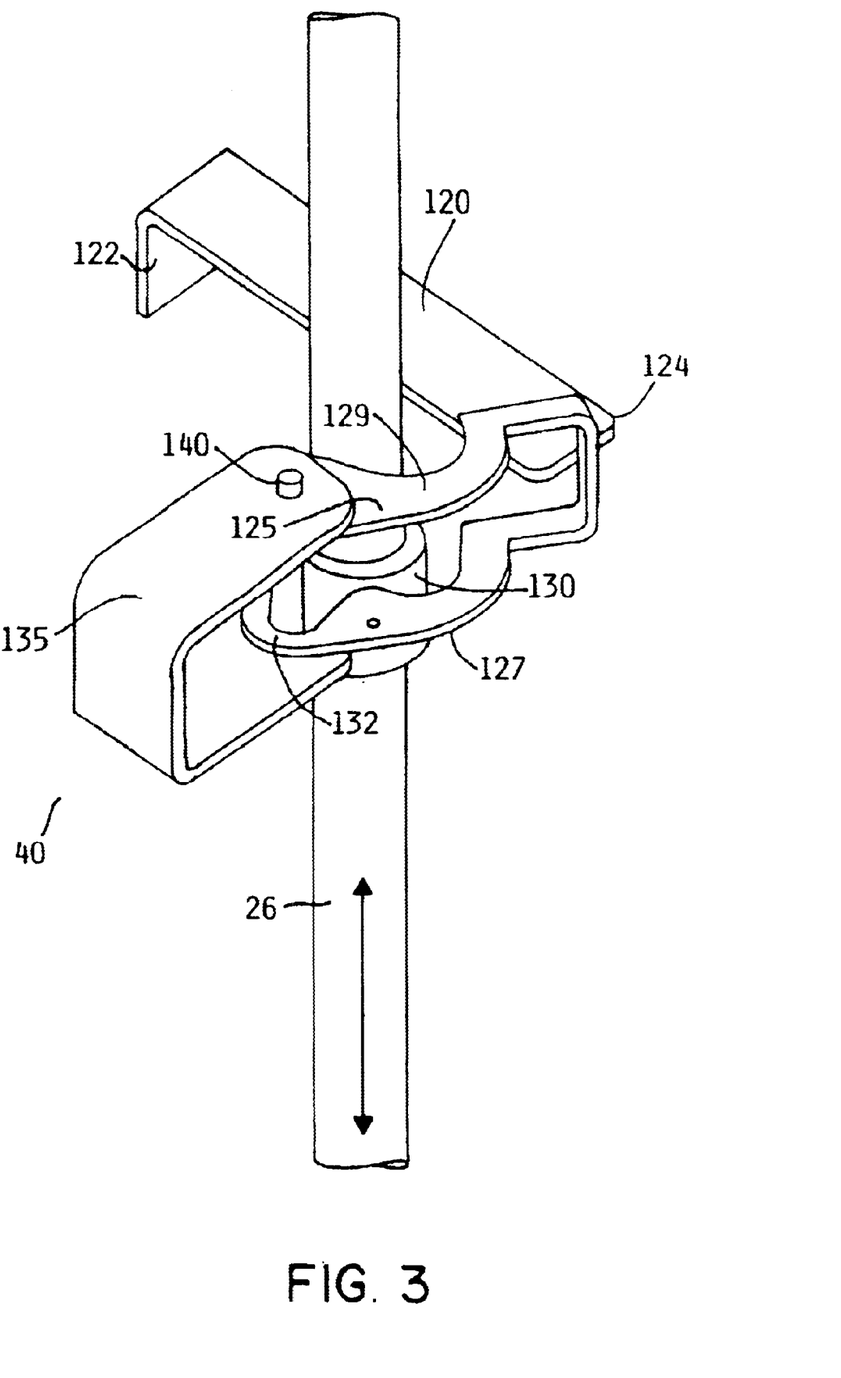
FIG. 3 is a front view of the safety lock assembly.

In conjunction with the bellcrank assembly 50, the dual hinge door includes a safety lock assembly 40. FIG. 3 is a perspective view of the safety lock assembly 40, which is mounted to the lock pin 26 between guides 34 on the upper door assembly, and to the lock pin 28 between the guide 34 and the support 36 on the lower door assembly. The safety lock assembly 40 includes a release bracket 120, a catch bracket 125, a catch collar 130, and a secondary bracket 135. The purpose of the safety lock assembly 40 is to mechanically hold the lock pins 26 and 28 in a stationary position. A lower vertical leg 122 of the release bracket 120 mounts to the frame of the enclosure and is in a fixed position. The opposite horizontal end 124 of the release bracket 120 is received by the catch bracket 125. A second end of the catch bracket 132 is secured to the secondary bracket 135 by a pin 140. The secondary bracket 135 is fixed to an interior surface of the door. At such time as the lock pin 26 moves in an vertical direction upward, or the lock pin 28 moves in a vertical direction downward, the collar 130 is moved between the two arms 127 and 129 of the catch bracket 125. At the initial stages of releasing the door, there is relative motion between the release bracket 120 and the catch bracket 125. As the door is slightly opened, the catch bracket 125 captures the collar 130 and holds the lock pins 26 and 28 stationary. Accordingly, the safety lock assembly 40 holds the switch 20 in place once the collar 130 is placed within the catch collar 125 to allow only opening or closing of the door.

Figure 6:
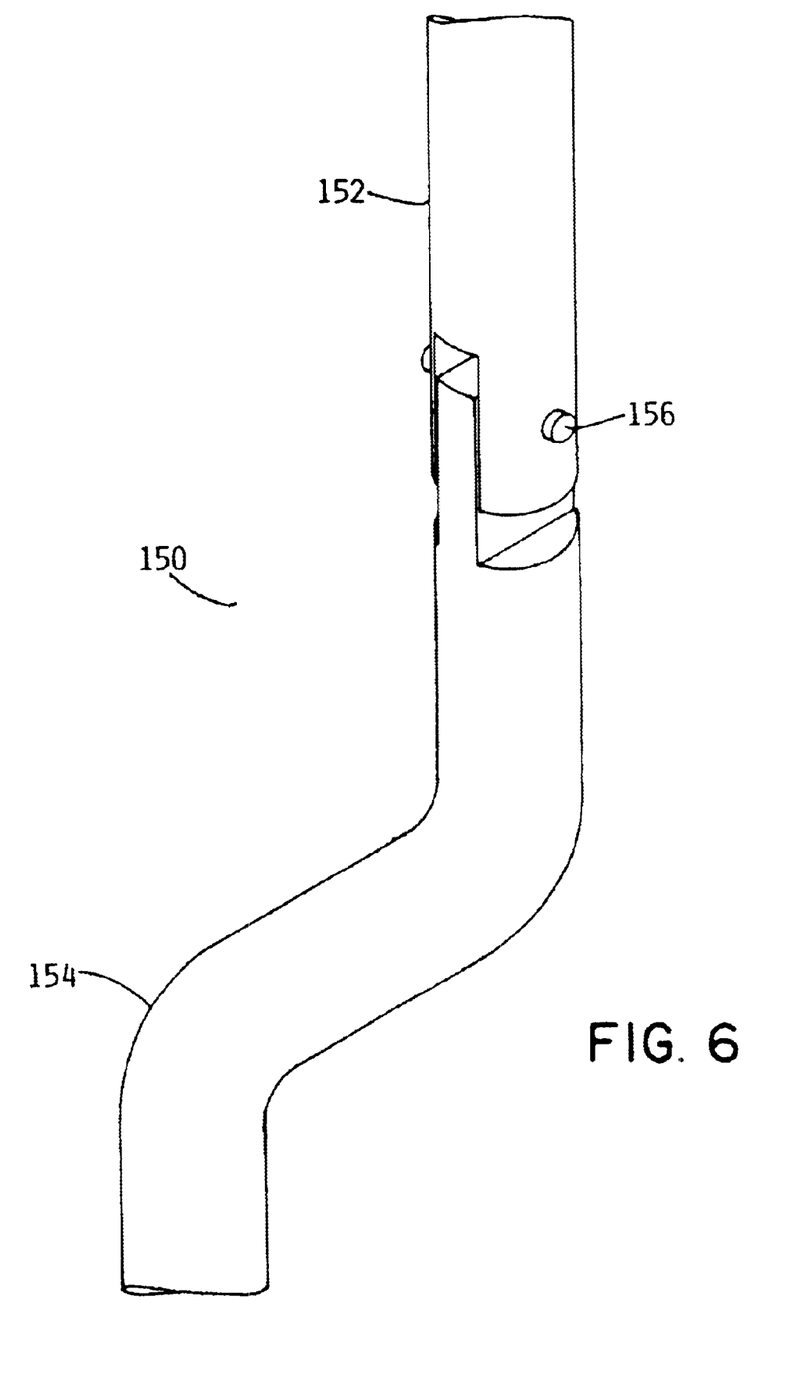
FIG. 6 is a front view of the lock pin.

As shown in FIG. 1, each side of the door 15 includes a lower lock pin 28 and an upper lock pin 26. FIG. 6 is a front view of a sample upper lock pin 150. Both sections 152 and 154 of the pin 150 are joined at 156 by a pivot pin. This allows the upper vertical pin 152 to move in a vertical direction, and the lower vertical pin 154 to move in both horizontal and vertical directions. The bellcrank assembly 50 requires the horizontal motion of the lower section 154 of pin 150. Accordingly, the pivot pin 156 provides freedom of movement between the upper and lower sections 152 and 154, respectively, while enabling communication between the two sections.

Figure 4:
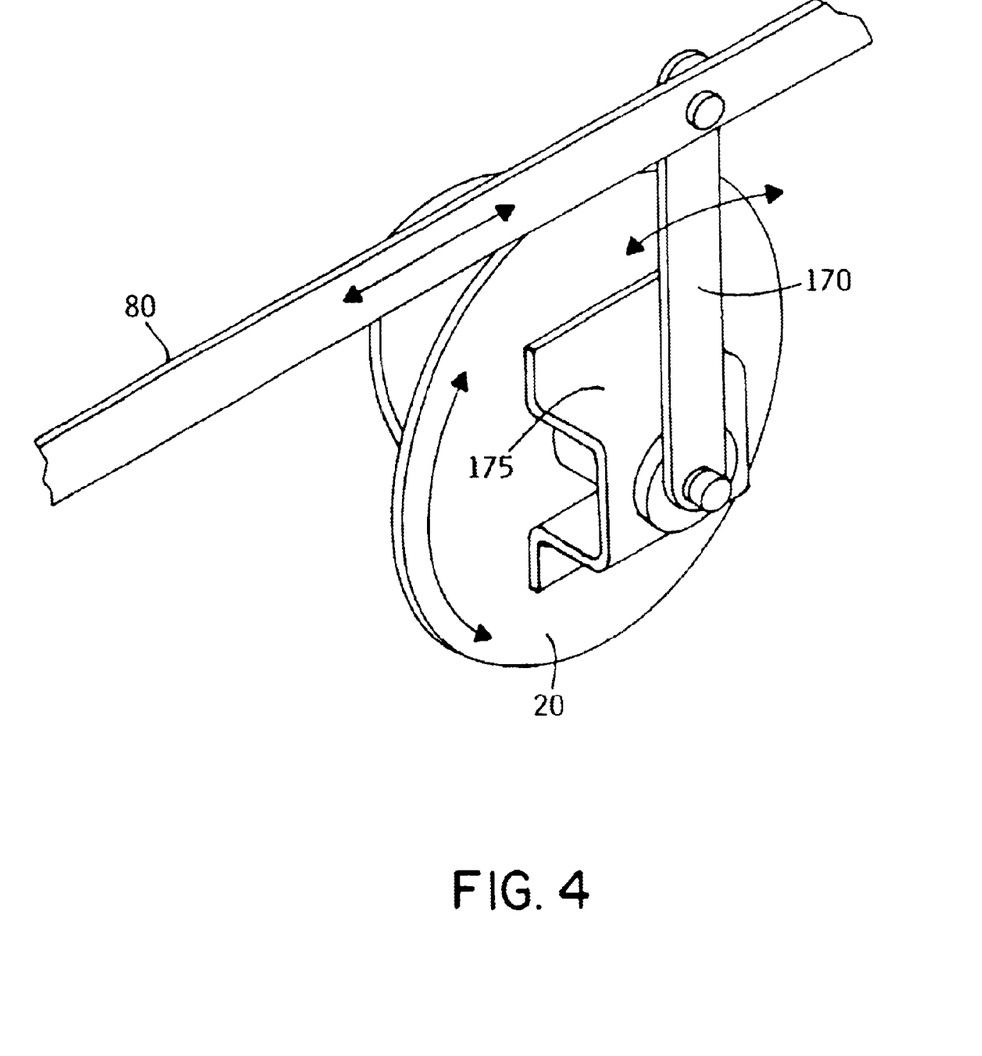
FIG. 4 is a perspective view from the left side of the switch.

Mounted between both sides of the door is a horizontal link 80 connecting the two bellcrank assemblies 50. Attached to the horizontal link 80 is a switch 20 for selecting a side of the door for opening. An example of the placement of the switch 20 with respect to the door assembly is shown in FIG. 1. In this example, the switch is placed in the center of the door and is visible to the operator. FIG. 4 is a detailed drawing illustrating the connection of the switch 20 to the horizontal link 80 from inside the door. In this example, the switch is connected to the horizontal link 80 by a vertical bar 170. The switch 20 is mounted to the door 15 by a mounting bracket 175 and the vertical bar 170 connecting the mounting bracket 175 directly to the horizontal link 80. As the switch 20 is rotated in either direction, the horizontal bar 80 is moved horizontally in the same direction. Accordingly, the switch 20 functions as a communication tool from the operator to the door assembly.

Figure 5:
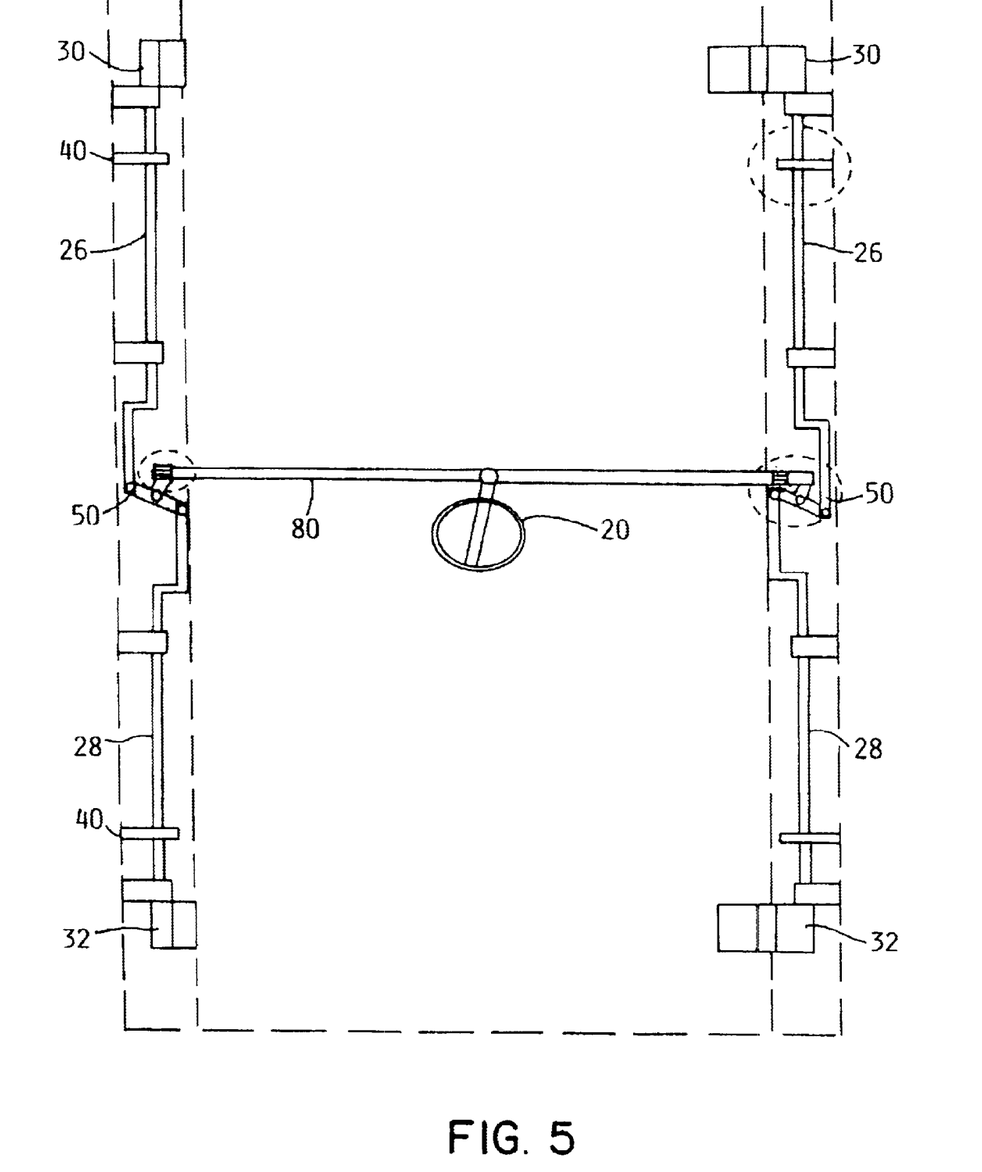
FIG. 5 is a front view of the dual hinge door assembly with the switch positioned to open the right side of the door.

Motion of the horizontal bar 80 causes the lock pins 26 and 28 to move vertically upward and downward, respectively, depending upon the direction of selection of the switch 20. FIG. 5 is a front view of the door with the switch positioned to open the right side. The horizontal bar 80 is shown moved slightly to the right. The bell crank assembly 50 on the left side of the door is rotated by the mechanical link 80 and causes the upper lock pin 26 on the left side to move in an upward direction and a lower lock pin 28 on the left side to move in a downward direction. The movement of the lock pins 26 and 28 moves both pins into the respective latches 30 and 32. At the same time, the translation of the horizontal bar 80 causes the bell crank assembly 50 on the right side of the door to rotate in the opposite direction of the bell crank assembly 50 on the left side of the door. As discussed in the details of the bellcrank assembly 50, the bellcrank actuates the door handle 100 while moving the upper lock pin 26 on the right side of the door in a downward direction, and moving the lower lock pin 28 on the right side of the door in an upward direction. The movement of the lock pins 26 and 28 on the right side of the door releases the pins 26 and 28 from the latches 30 and 32, respectively. The door handle is now visible to the operator. Once the door handle 100 is pulled outward by the operator, the safety locks 40 on the left side of the door assembly secure the respective collars 130 on the lock pin 26 and 28 in the associated catch bracket 125. This occurs simultaneously for the safety locks 40 on the upper lock pin 26 and the lower lock pin 28. Both lock pins 26 and 28 on the left side of the door are then secured. The right side of the door is opened while the left side of the door is rotated about the latches 30 and 32. Accordingly, the switch 20 operates in conjunction with the horizontal bar 80, bell crank assemblies 50, and safety locks 40 to ensure that one side of the door is opened while the other side remains secured and hinged.

Figure 7:
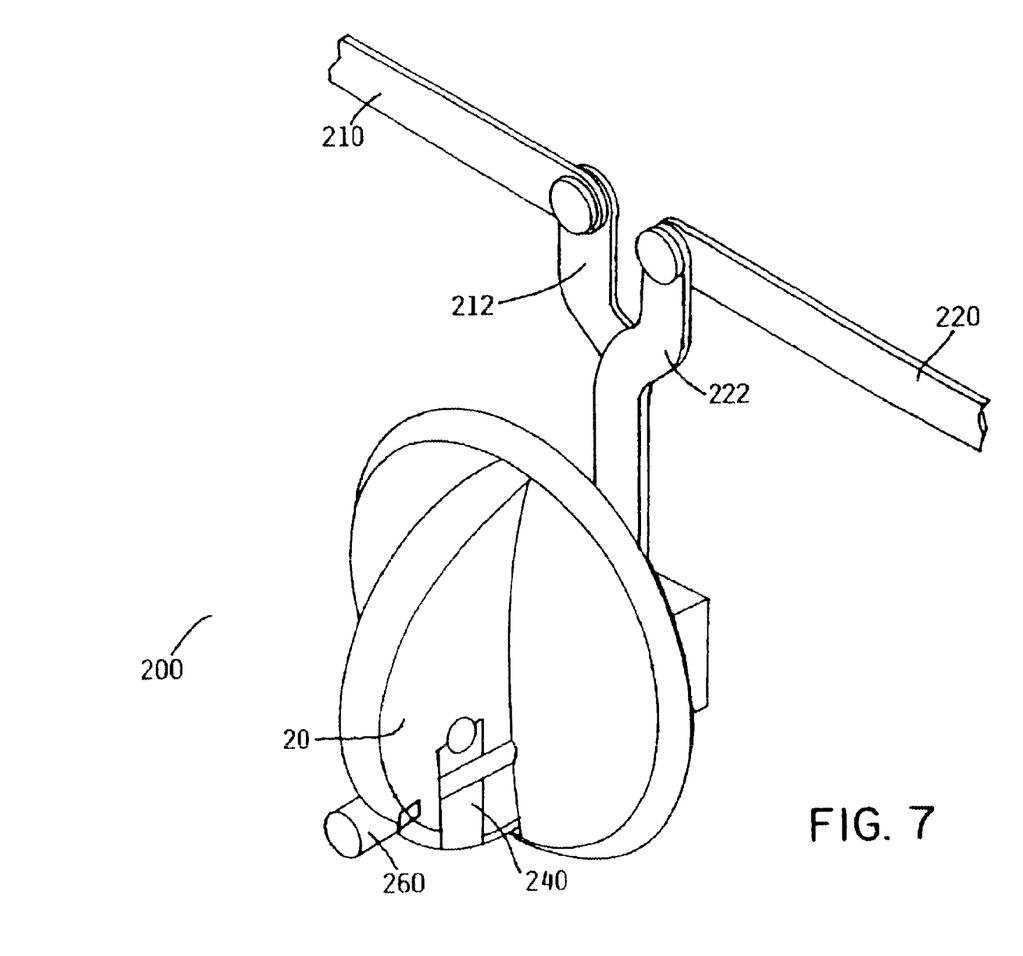
FIG. 7 is a perspective view of a modified switch taken from outside the door.

In a further embodiment, the dual hinge door assembly may be modified to allow an operator to remove the access panel from the housing by pulling a handle on both sides of the door. FIG. 7 is a perspective view of a modified switch assembly 200 taken from outside the panel. The horizontal bar 80 has been replaced by two horizontal links 210 and 220. The distal end of link 210 secures to the bellcrank assembly 50 on the left side of the door, and the distal end of the link 220 secures to the bellcrank assembly 50 on the right side of the door. The proximal end of links 210 and 220 are both secured to a vertical connector 212 and 222, respectively. The distal end of each of the connectors 212 and 222 has an aperture 214 and 224, respectively. Apertures 214 and 224 are adapted to receive a prong 240. The prong 240 extends from an external side of the switch assembly 200 to an interior assembly of the switch. The distal end of the prong 240 has two vertical legs 242 and 244. Leg 242 is received by aperture 214 and leg 244 is received by aperture 224. In addition, connector 212 has an opening 216 above the aperture 214 and connector 222 has an opening 246 above the aperture 224. Openings 216 and 246 are adapted to receive a pin 260 that extends from an external side of the switch assembly 200, through the actuator 240, and joins the connectors 212 and 222. To select one side of the door for opening, the operator presses the pin 260 into the prong 240 and rotates the selector knob 20 in the direction of the side of the door the operator wants to release, and the handle adjacent to the selected side of the door will be released from the door. For example, if the operator rotates the selector knob toward the right side of the door, links 210 and 220 will operate together and both move to the right, similar to the function of the assembly shown in FIG. 5. Accordingly, the modified assembly shown in FIG. 7 allows the door assembly to function along the same principles as that illustrated in FIG. 5 engineered with a single horizontal bar 80.

Figure 8:
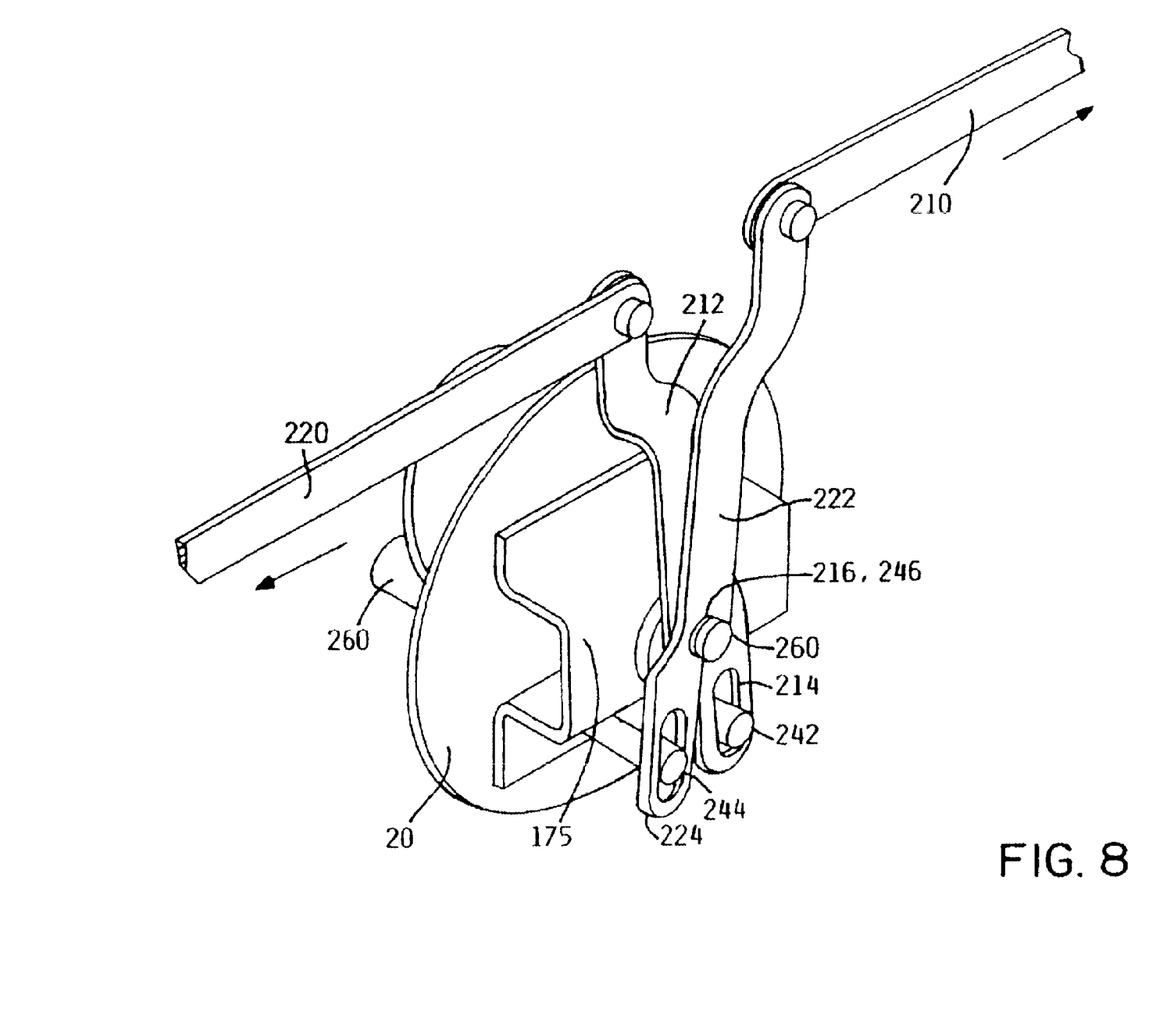
FIG. 8 is a perspective view of a modified switch taken from inside the door.

FIG. 8 is a perspective view of the modified switch assembly 200 taken from inside the door panel. To release both sides of the door from the housing, pin 260 must be pulled in an outward direction to release connectors 212 and 222. The prong 240 must then be rotated in a counterclockwise direction. Rotation of the prong 240 pushes the apertures 214 and 224 apart, thereby causing each of the connectors 212 and 222 to move in opposite directions, which causes horizontal movement of links 210 and 220. Link 210 moves in the direction of the left side of the door, and link 220 moves in the direction of the right side of the door. The movement of the links 210 and 220 causes the bellcrank assemblies 50 on each side of the door to rotate and release the lock pins 26 and 28. Movement of the bellcrank assemblies 50 which also releases the associated door handle 100 on each side of the door. The operator must pull both released handles simultaneously, or near simultaneously, to remove the door from the housing. To place the door back on the housing following removal of the door from the housing, the door must be placed in the proper position on the housing. The prong 240 is then rotated by the operator in a clockwise direction to the position shown in FIG. 7. Pin 260 is then pressed in an inward direction to secure the connectors 212 and 222. Accordingly, the assembly shown in FIGS. 7 and 8 allows an operator to select to remove the door from the housing by pulling on handles located on each side of the door.

Advantages Over the Prior Art

The dual hinge assembly provides a switch for selecting one side of a door for opening or for removing the door from the housing. Upon moving the switch in one of two directions, a door handle will be made visible to the operator. When the operator engages and pulls the handle, the assembly on the opposite side of the door will secure and the lock pins will function as a hinge for rotation of the door. The switch is a visual indicator for the operator to select a side for opening. The handle only becomes visible and operable to the operator upon movement of the switch from an intermediate position. The door handle functions as a visual indicator of the side of the door selected for opening, and as a tool for engaging safety locks on the side of the door not selected for opening. In addition, the operator may select to remove the door from the housing. Upon properly actuating the switch assembly, a handle on each side of the door is released and the handles become visible to the operator. The operator must pull both released handles simultaneously, or near simultaneously, to remove the door from the housing. Accordingly, the switch in conjunction with the door handle functions as a visual indicator for opening a side of the door or for removing the door from the housing.

Alternative Embodiments

It will be appreciated that, although specific embodiments of the invention have been described herein for purposes of illustration, various modifications may be made without departing from the spirit and scope of the invention. In particular, the door handles 100 are shown flush with the door when the door is in a closed position. However, the door handles 100 may also be in a recessed position so that they are not visible to the operator until a switch activates one of the handles. In addition, the switch 20 is shown on the front face of the door 15. However, the switch may be located in a plurality of locations and is not limited to the front face. For example, the switch may be located on the top, bottom, or either side of the door. In addition, the switch does not have to be directly mounted to the horizontal bar 80. Rather, the switch may be located in an area that is visible or invisible to an operator looking at the front of the door 15. In this embodiment, the switch may be connected to the horizontal bar 80 by a cable, a mechanical link, or a similar structure providing the strength and agility to cause translation of the horizontal bar in the direction of the switch. Accordingly, the scope of protection of this invention is limited only by the following claims and their equivalents.

We claim:

1. A computer housing comprising:
   (a) a dual hinge door;
   (b) a switch to select a side of the door to open;
   (c) a safety lock in communication with said switch, said lock having a lock pin adapted to be vertically deployed to prevent accidental release of said door;
   (d) a horizontal bar to connect both sides of said door; and
   (e) a first handle adjacent to a left side of said door and a second handle adjacent to a right side of said door, wherein said first handle and said second handle are adapted to be made visible to open said door upon movement of said switch from an intermediate position.

2. The housing of claim 1, further comprising a bell crank assembly to convert horizontal motion from said horizontal bar to vertical motion.

3. The housing of claim 1, wherein release of a pin and rotation of a prong adjacent to said switch releases said handle adjacent to each side of said door.

4. The housing of claim 3, wherein pulling of handles adjacent to both sides of said door releases said door.

5. A computer housing comprising:
   (a) a dual hinge door;
   (b) a switch to select a side of the door to open;
   (c) a safety lock in communication with said switch, said lock having a lock pin adapted to be vertically deployed to prevent accidental release of said door; and
   (d) a first handle adjacent to a left side of said door and a second handle adjacent to a right side of said door, wherein said first handle and said second handle are adapted to be made visible to open said door upon movement of said switch from an intermediate position.

6. The housing of claim 5, wherein said switch is mounted on said door in a location selected from the group consisting of: top, bottom, left side and right side.

7. The housing of claim 5, wherein pulling of said visible handle opens a side of said door adjacent to said visible handle.

8. The housing of claim 5, further comprising a horizontal bar extending across a width of the door.

9. The housing of claim 8, wherein said switch is connected to said bar.

10. The housing of claim 9, further comprising a cable to connect said switch to said horizontal bar.

11. The housing of claim 8, wherein said switch is directly mounted to said bar.

12. The housing of claim 5, further comprising a bell crank assembly an each side of said door in communication with a lock pin of said hinge and said door handle.

13. The housing of claim 12, wherein said bell crank assembly converts horizontal motion communicated from said switch to vertical motion of said lock pin.

14. The housing of claim 12, wherein said bell crank assembly retracts a set of lock pins from a set of associated latches on a side of said door selected for opening.

15. The housing of claim 12, wherein said bell crank assembly forces a set of lock pins into a set of associated latches on a side of said door selected to remain stationary.

16. The housing of claim 5, further comprising a set of horizontal bars extending from said switch to a bell crank assembly on each side of said door.

17. The housing of claim 16, further comprising a pin to hold together said set of horizontal bars.

18. The housing of claim 17, wherein release of said pin and rotation of a prong releases said handle adjacent to each side of said door.

19. The housing of claim 18, wherein pulling of handles adjacent to both sides of said door releases said door.

* * * * *